(12) United States Patent
Utsugi (10) Patent No.: US 8,736,720 B2
(45) Date of Patent: May 27, 2014

(54) IMAGE PROCESSING DEVICE FOR CORRECTING IMAGE COLORS AND IMAGE PROCESSING PROGRAM

(75) Inventor: Akihiko Utsugi, Machida (JP)

(73) Assignee: Nikon Corporation, Tokyo (JP)

( * ) Notice: Subject to any disclaimer, the term of this patent is extended or adjusted under 35 U.S.C. 154(b) by 382 days.

(21) Appl. No.: 12/312,921

(22) PCT Filed: Nov. 26, 2007

(86) PCT No.: PCT/JP2007/001301
§ 371 (c)(1),
(2), (4) Date: Jun. 1, 2009

(87) PCT Pub. No.: WO2008/068889
PCT Pub. Date: Jun. 12, 2008

(65) Prior Publication Data
US 2010/0073523 A1 Mar. 25, 2010

(30) Foreign Application Priority Data
Dec. 8, 2006 (JP) ................................. 2006-331736

(51) Int. Cl.
*H04N 1/58* (2006.01)
*H04N 1/60* (2006.01)
*H04N 9/68* (2006.01)

(52) U.S. Cl.
USPC ............................ 348/242; 348/256; 382/167

(58) Field of Classification Search
CPC ........... H04N 9/68; H04N 9/646; H04N 1/60; H04N 1/58

USPC .............. 348/222.1, 223.1, 240.99, 255–256; 382/167

See application file for complete search history.

(56) References Cited

U.S. PATENT DOCUMENTS

| 5,895,836 A * | 4/1999 | Uzik ......................... 356/243.5 |
| 6,980,326 B2 * | 12/2005 | Tsuchiya et al. ............... 358/1.9 |
| 7,389,075 B2 * | 6/2008 | Takahashi et al. ............. 399/301 |
| 2006/0098253 A1 * | 5/2006 | Masuno et al. ............... 358/518 |
| 2007/0035641 A1 | 2/2007 | Yamada et al. |

FOREIGN PATENT DOCUMENTS

| JP | A-11-88704 | 3/1999 |
| JP | A-2000-299874 | 10/2000 |
| JP | A-2002-299875 | 10/2000 |
| JP | A-2002-262300 | 9/2002 |
| JP | A-2002-344978 | 11/2002 |
| JP | A-2004-61930 | 2/2004 |
| JP | A-2006-14261 | 1/2006 |

OTHER PUBLICATIONS

Kappos, David J. "Subject Matter Eligibility of Computer Readable Media", Jan. 26, 2010.*

* cited by examiner

*Primary Examiner* — Zachary Wilkes
(74) *Attorney, Agent, or Firm* — Oliff PLC (57) ABSTRACT

An image processing device of the present application detects a color drift of an input image, and includes a saturation reducing section and a color drift detecting section. The saturation reducing section reduces a saturation of the input image and generates a saturation reduction image. The color drift detecting section detects a color drift of the saturation reduction image.

8 Claims, 7 Drawing Sheets

IMAGE PROCESSING DEVICE FOR CORRECTING IMAGE COLORS AND IMAGE PROCESSING PROGRAM

CROSS-REFERENCE TO RELATED APPLICATION

This application is a U.S. National Stage application claiming the benefit of prior filed International Application Number PCT/JP2007/001301, filed Nov. 26, 2007, in which the International Application claims a priority date of Dec. 8, 2006 based on prior filed Japanese Application Number 2006-331736, the entire contents of which are incorporated herein by reference.

TECHNICAL FIELD

The present application relates to an image processing device for correcting the color of an image, and to an image processing program.

BACKGROUND ART

In general, due to magnification chromatic aberration of a shooting lens, color drift occurs in a picked-up image of an electronic camera. Moreover, it is known that, due to an error in alignment (registration error) of an image pickup device, color drift occurs in a picked-up image of a three-plate imaging apparatus.

Technologies for correcting such kind of color drift by image processing have been proposed. For example, a conventional apparatus according to Patent Document 1 detects color drift for an edge portion of an image first, and performs image processing for correcting the color drift.

Moreover, a conventional apparatus according to Patent Document 2 adjusts magnification for each color component of an image and searches a minimum point of difference between color components, to correct magnification chromatic aberration of the image.

Patent Document 1: Japanese Unexamined Patent Application Publication No. 2000-299874
Patent Document 2: Japanese Unexamined Patent Application Publication No. 2002-344978

DISCLOSURE

Problems to be Solved

Usually, in an electronic camera, processing for emphasizing saturation is generally performed on the output image of an image pickup device. In the saturation emphasizing processing, difference in signal level between color components of an image is extended. Thus, if saturation emphasizing processing is performed on an image including color drift, one of the color components (for example, R) will be influenced by other color components (for example, G) with position drifted, and the color structure itself will deteriorate.

Therefore, when color drift detection by image analysis (for example, Patent Document 1) is performed on the image after saturation emphasis, color drift cannot be detected correctly. Moreover, when position correction of color drift is performed on the image after saturation emphasis, the deteriorated structure of the color cannot be united completely and color drift cannot be corrected accurately.

Accordingly, a proposition of the present application is to suitably detect or correct the color drift of an input image in which the saturation emphasis is performed.

Means for Solving the Problems

<1> An image processing device of the present embodiment detects a color drift of an input image, and includes a saturation reducing section and a color drift detecting section.

The saturation reducing section reduces a saturation of the input image and generates a saturation reduction image.

The color drift detecting section detects a color drift of the saturation reduction image.

<2> In addition, preferably, the image processing device includes an inverse transforming section which acquires information on a saturation emphasis performed on the input image and calculates an inverse transformation of the saturation emphasis. The saturation reducing section performs the inverse transformation on the input image and generates the saturation reduction image.

<3> Moreover preferably, the inverse transforming section calculates the inverse transformation of the saturation emphasis by approximation.

<4> In addition, preferably, the image processing device includes a color drift correcting section which performs a color drift correction on the saturation reduction image generated by the saturation reducing section based on the color drift detected by the color drift detecting section, and generates a color drift correction image.

<5> Further preferably, the image processing device includes a saturation emphasizing section which emphasizes a saturation of the color drift correction image generated by the color drift correcting section.

<6> In addition, preferably, the saturation emphasizing section performs the inverse transformation of the saturation reduction by the saturation reducing section on the color drift correction image.

<7> Another image processing device of the present embodiment corrects a color drift of an input image, and includes a saturation reducing section and a color drift correction section.

The saturation reducing section reduces a saturation of the input image and generates a saturation reduction image.

The color drift correcting section performs a color drift correction on the saturation reduction image and generates a color drift correction image.

<8> An image processing program of the present embodiment causes a computer to function as the image processing device according to any one of items <1> to <7>.

Effect

The present embodiment suppresses the modification of color structure occurred in the input image in advance by reducing saturation of an input image. It is possible to detect or correct the color drift more suitably by detecting or correcting color drift from the image in which the saturation reduction is performed.

DETAILED DESCRIPTION OF THE EMBODIMENTS

First Embodiment

Description of a Configuration of an Image Processing Device

Figure 1:
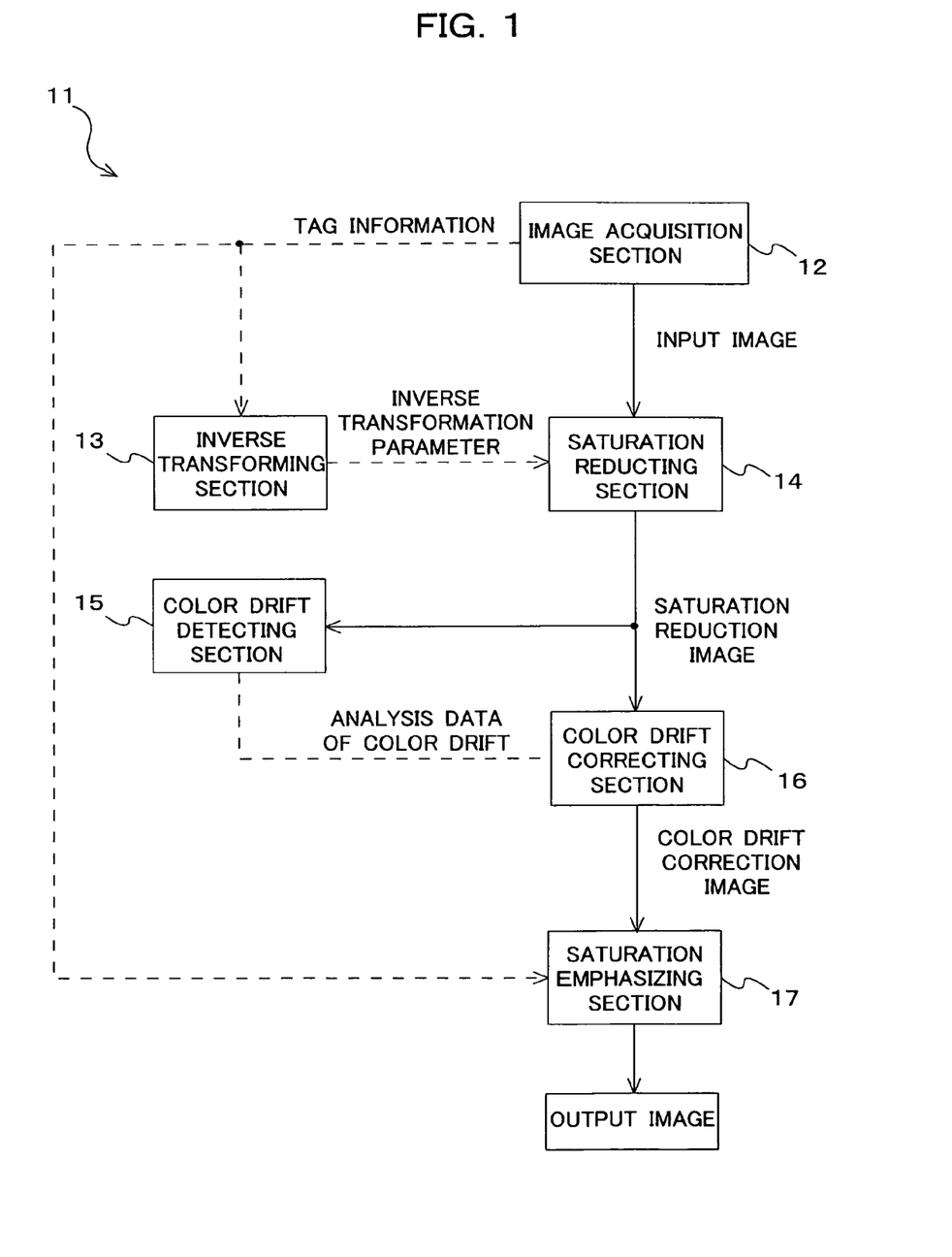
FIG. 1 is a block diagram showing a configuration of an image processing device 11.

FIG. 1 is a block diagram showing a configuration of an image processing device 11. In FIG. 1, an image acquiring section 12 stores an input image that is a processing target in an internal memory thereof. An inverse transforming section 13 acquires information on the saturation emphasis performed in advance on the input image, and calculates inverse transformation of the saturation emphasis. A saturation reducing section 14 performs the inverse transformation on the input image and obtains a saturation reduction image. A color drift detecting section 15 detects drift between color components for the saturation reduction image. A color drift correcting section 16 performs color drift correction on the saturation reduction image according to information on the color drift. A saturation emphasizing section 17 again performs saturation emphasis comparable to that of the input image on the image after color drift correction.

In addition, a computer and an image processing program may realize the image processing device 11 using software. Moreover, it is possible to incorporate the image processing device 11 in an imaging apparatus such as an electronic camera or a scanner to use it for image processing in the imaging apparatus.

Description of Operation of the First Embodiment

Figure 2:
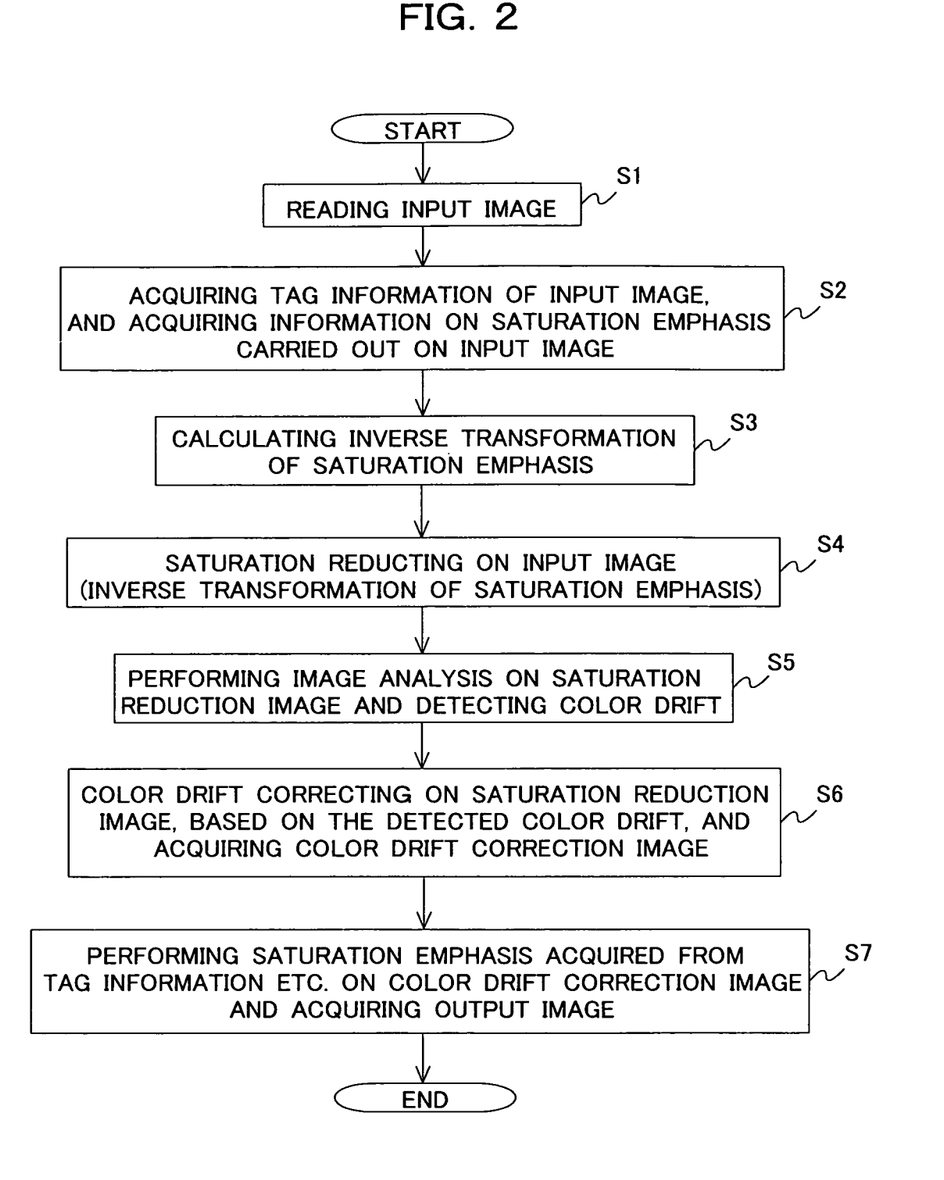
FIG. 2 is a flow chart showing operation of a first embodiment.

FIG. 2 is a flow chart showing operation of the first embodiment. Hereinafter, the operation will be described in a sequential-order of step numbers shown in FIG. 2.

Step S1: The image acquiring section 12 reads an input image U generated by an electronic camera etc. through a communication medium or a recording medium. For example, the input image U is transformed into signal values (RU, GU, BU) of RGB color components, and is then stored in the internal memory.

Step S2: The inverse transforming section 13 reads tag information (such as EXIF information) from the inside of a file of the input image. On the tag information, information on saturation emphasis performed in advance on the input image.

For example, with respect to the color components (RU, GU, BU) of the input image U, in the processing in the electronic camera, the following saturation emphasis is performed preliminary.

$$\begin{pmatrix} RU \\ GU \\ BU \end{pmatrix} = M \begin{pmatrix} RS \\ GS \\ BS \end{pmatrix} \quad [1]$$

$$M = \begin{pmatrix} 1.3 & -0.3 & 0 \\ -.01 & 1.2 & -.01 \\ -0.1 & -0.2 & 1.3 \end{pmatrix}$$

M in the formula is a transformation matrix of saturation emphasis performed in the electronic camera. Numeral values of respective elements of the transformation matrix M are stored on the tag information. Moreover, (RS, GS, BS) in the formula are color components before the saturation emphasis. If the electronic camera is set in a JPEG record mode, such kinds of color components (RS, GS, BS) cannot be acquired directly because they are not output outside the camera.

Step S3: The inverse transforming section 13 calculates inverse transformation regarding the saturation emphasis acquired at Step S2.

For example, inverse transformation $M^{-1}$ of the above-mentioned saturation emphasizing transformation matrix M is expressed by the following formula using a well-known inverse-matrix operation.

$$M^{-1} = \begin{pmatrix} 0.79 & 0.20 & 0.01 \\ 0.07 & 0.86 & 0.07 \\ 0.07 & 0.15 & 0.78 \end{pmatrix} \quad [2]$$

Step S4: The saturation reducing section 14 acquires information on the inverse transformation of saturation emphasis from the inverse transforming section 13. The saturation reducing section 14 performs the inverse transformation on the input image U, reduces saturation, and generates a saturation reduction image.

For example, by using the inverse transformation $M^{-1}$, color components (RD, GD, BD) of the saturation reduction image are expressed by the following formula.

$$\begin{pmatrix} RD \\ GD \\ BD \end{pmatrix} = M^{-1} \begin{pmatrix} RU \\ GU \\ BU \end{pmatrix} \quad [3]$$

Step S5: The color drift detecting section 15 performs image analysis on the color components (RD, GD, BD) of the saturation reduction image and detects color drift of the image.

For example, it is possible to detect the direction and the width of color drift by performing edge extraction on each of the color components (RD, GD, BD) and detecting position drift between the color edges.

Step S6: The color drift correcting section 16, based on the information on color drift obtained at Step S5, corrects color drift of the saturation reduction image and obtains a color drift correction image.

For example, the color drift correcting section 16 replaces the positions of the color components RD and BD by an amount corresponding to color drift based on the pixel position of the color component GD of the saturation reduction image, and calculates correction positions of RD and BD. By interpolating the correction positions of RD and BD, the color drift correcting section 16 obtains color components RD' and BD' in which the color drift correction is performed on the pixel position of the color component GD. It is possible to obtain color components (RD', GD, BD') of a color drift correction image by performing a component on the color components RD' and BD', in which the color drift correction is performed, and the color component GD of the input image.

Step S7: Since saturation reduction is performed on the color drift correction image at Step S4, saturation of the image generally tends to be lower than that of the input image. Thus, the saturation emphasizing section 17 performs saturation emphasis on the color drift correction image and obtains an output image where saturation is compensated.

For example, the saturation emphasizing section 17 obtains color components (RZ, GZ, BZ) of the output image Z by applying the saturation emphasizing transformation matrix M acquired at Step S2 on the color drift correction image D.

$$\begin{pmatrix} RZ \\ GZ \\ BZ \end{pmatrix} = M \begin{pmatrix} RD' \\ GD \\ BD' \end{pmatrix} \quad [4]$$

Effect Etc. of the First Embodiment

Figure 3:
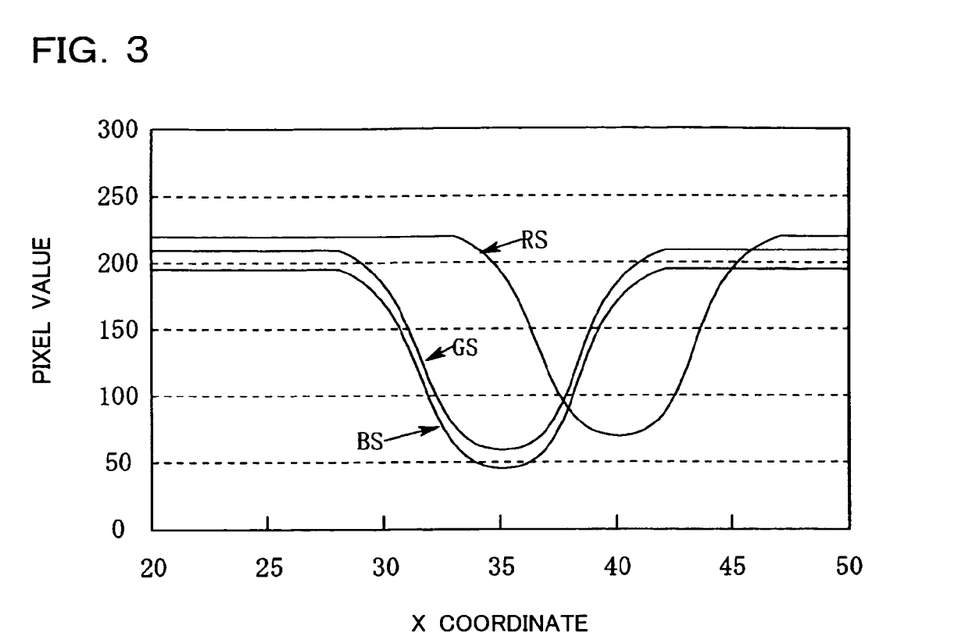
FIG. 3 is a view showing states of color drift of color components (RS, GS, BS) before saturation emphasis.

FIG. 3 is a view showing states of color drifts of color components (RS, GS, BS) before saturation emphasis. Here, for simplicity of description, a case where a color structure drifts towards the direction of the X coordinate of an image is shown. In a color drift portion, a false color difference component (RS−GS) which does not exist originally occurs.

Figure 4:
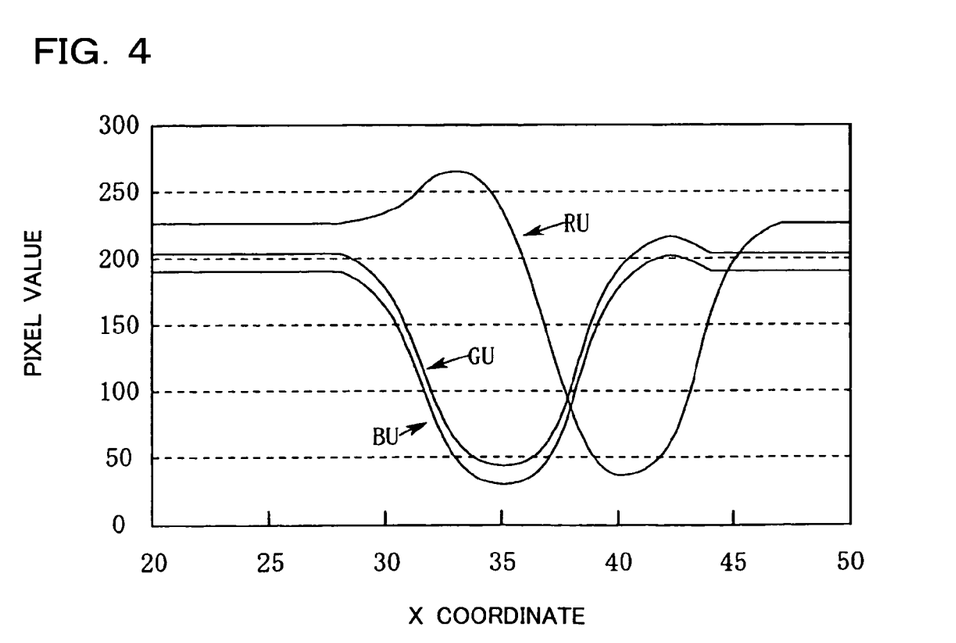
FIG. 4 is a view showing states of color components (RS, GS, BS) in which saturation emphasis is performed.

FIG. 4 is a view showing states in which saturation emphasis is performed on the color components (RS, GS, BS). Color components (RU, GU, BU) after the saturation emphasis correspond to the input image U that can be acquired from an electronic camera etc. In the saturation emphasis, the false color difference component (RS−GS) of the color drift portion is extended and amplified. Thus, in the color drift portions of the color components (RU, GU, BU), as illustrated in FIG. 4, false color structures (overshooting etc.) occur.

Due to the false color structures, fine swells (rises etc.) occur in color structures, and the positions of color boundaries are displaced. Thus, even if the color components (RU, GU, BU) are directly image analyzed, color drifts cannot be detected correctly.

Figure 5:
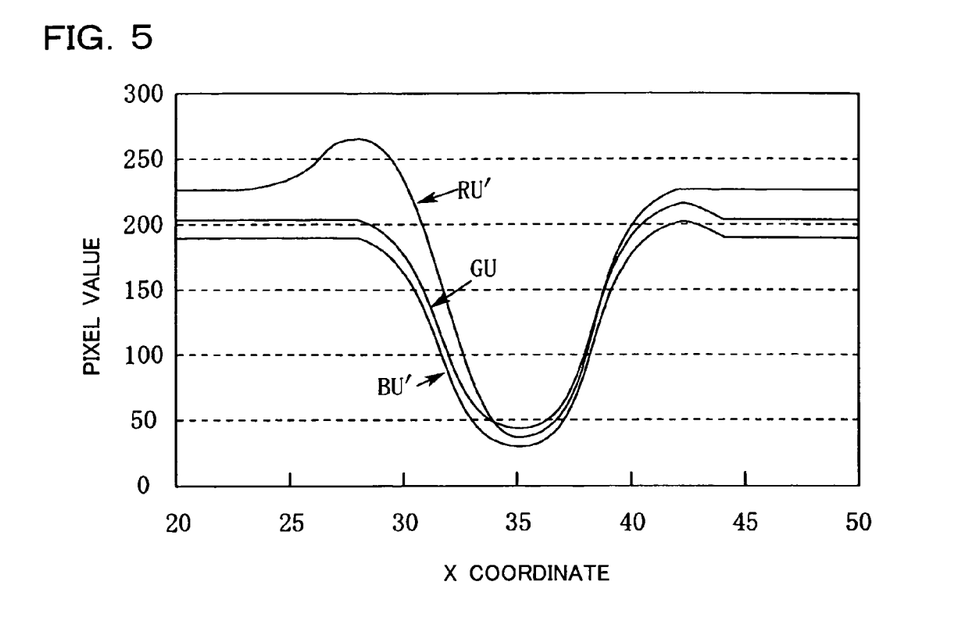
FIG. 5 is a view showing results of conventional color drift correction.

FIG. 5 is a view showing results of a conventional color drift correction performed on the input image. In this case, due to false color structures generated by color drifts and saturation emphasis in a complex manner, structural drifts of the color components (RU, GU, BU) cannot be removed only by color drift correction. Therefore, a problem such as false color contours remaining after the color drift correction has occurred conventionally.

Figure 6:
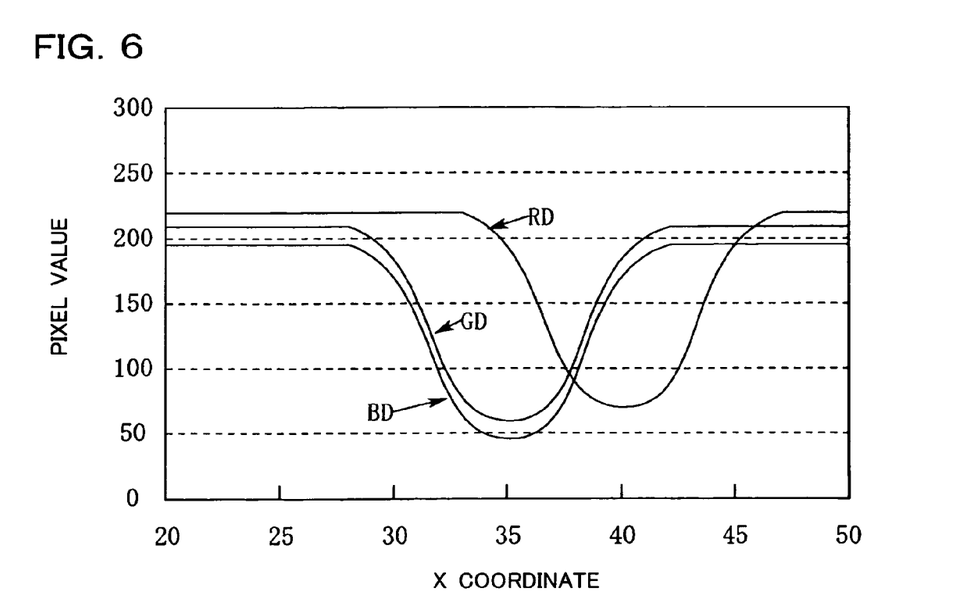
FIG. 6 is a view showing color structures of a saturation reduction image.

FIG. 6 is a view showing results of saturation reduction processing at Step S4 performed on the input image. Suppression of the color difference component (RU−GU) by the saturation reduction allows the suppression of false color structures generated by saturation emphasis in the electronic camera.

Especially, the saturation reduction image shown in FIG. 6 is acquired by the calculation of the inverse transformation of the saturation emphasis in the electronic camera, and performed the inverse transformation on the input image. In this case, the color components (RD, GD, BD) of the saturation reduction image approximately coincide with the color components (RS, GS, BS) before the saturation emphasis in the electronic camera. Therefore, false color structures can be removed almost completely.

In this way, the suppression of false color structures causes the color boundary of each color component to approach its original position. Therefore, image analysis of the color components (RD, GD, BD) enables to detect color drifts more correctly.

Figure 7:
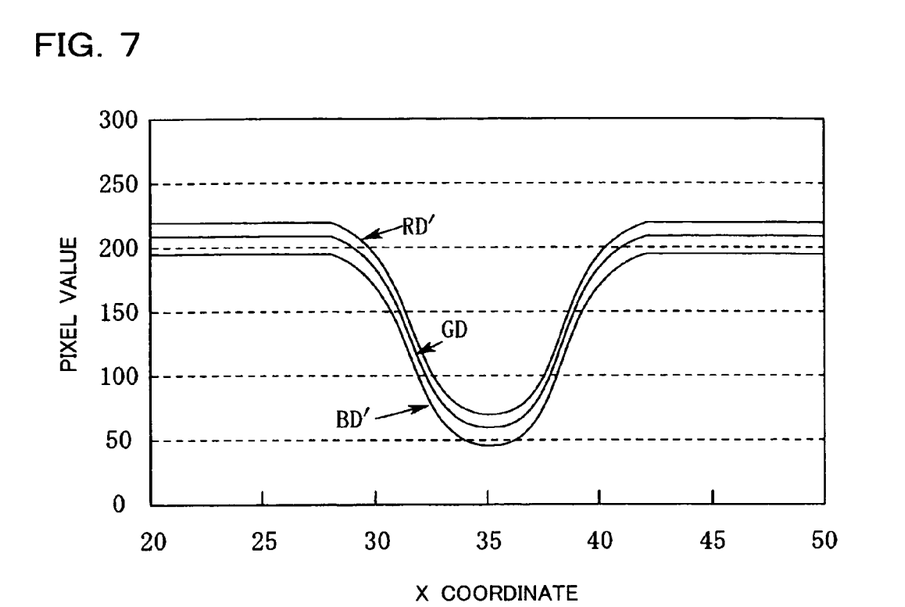
FIG. 7 is a view showing results of color drift correction with respect to a color drift correction image.

FIG. 7 is a view showing results of color drift correction performed on the saturation reduction image. In this case, since false color structures are suppressed, structures of color components (RD', GD, BD') coincide with each other well. Therefore, a disadvantage such as false color contours remaining after color drift correction will not occur.

Especially, since inverse transformation of saturation emphasis is performed on the color drift correction image illustrated in FIG. 7 that color drifts of the color components (RD', GD, BD') are removed almost completely. Therefore, the false color contours occur after color drift correction can be prevented almost completely.

Figure 8:
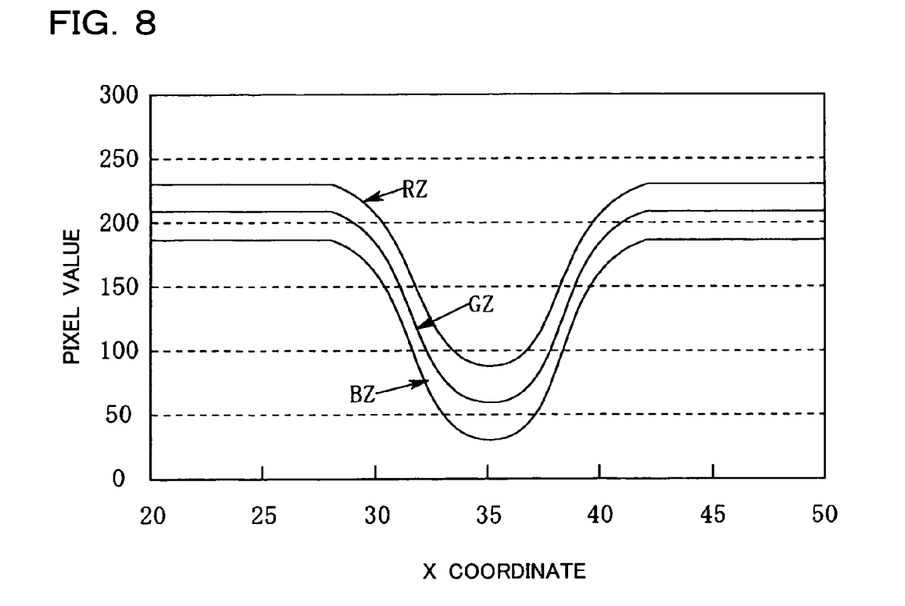
FIG. 8 is a view showing results of saturation emphasis with respect to the saturation reduction image.

FIG. 8 is a view showing results of saturation emphasis performed again on the color drift correction image. In this case, since false color difference components are fully suppressed in the color drift correction image, false color structures (overshooting etc.) are not generated by the amplification of the color difference components. Therefore, it is possible to obtain a high-quality image with less color drifts, false colors, and false color contours, and has fidelity to original color structures of an object.

Second Embodiment

Figure 9:
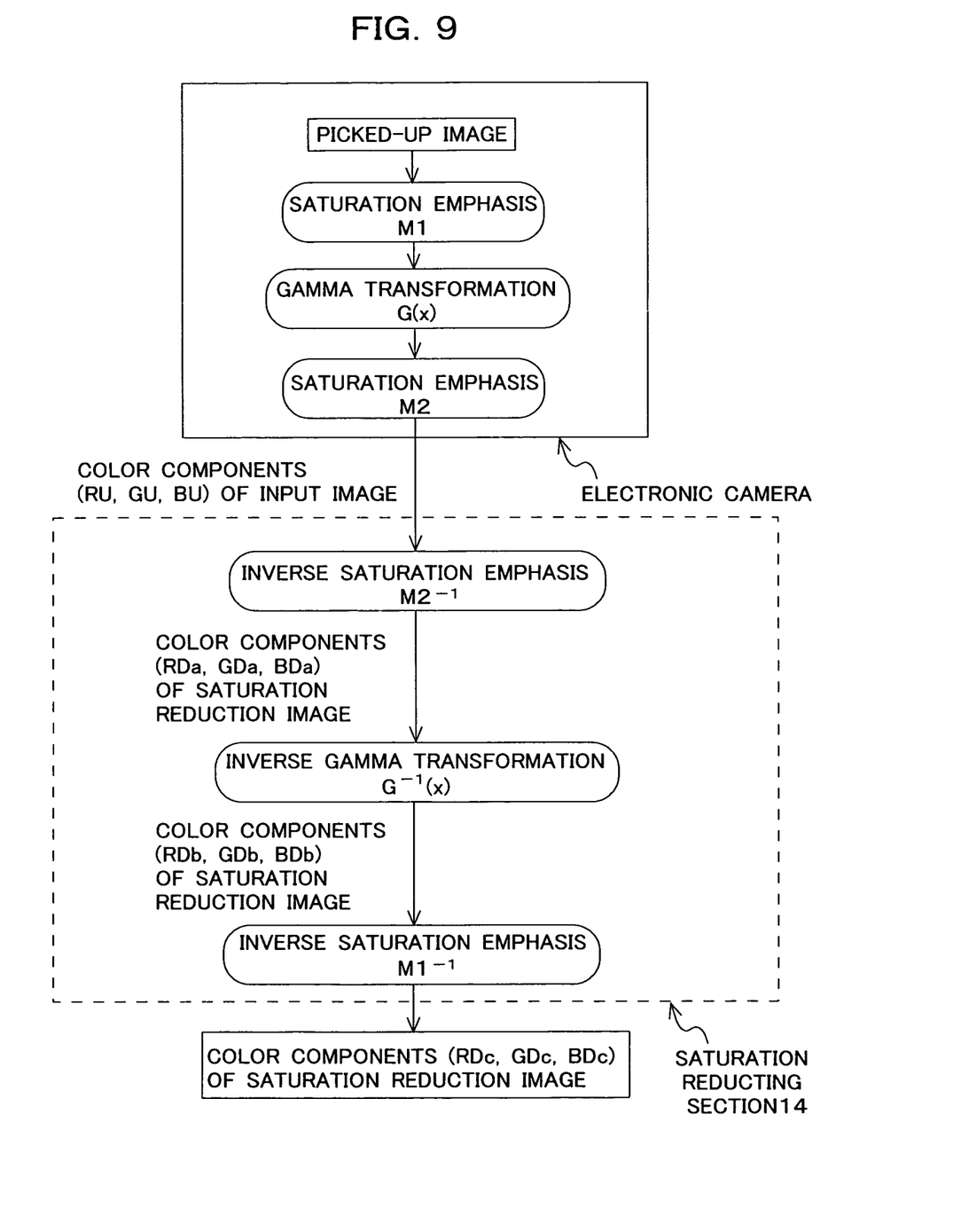
FIG. 9 is a flow chart showing operation of a second embodiment.

FIG. 9 is a view describing operation of a second embodiment. In addition, since a configuration of a device according to the second embodiment is the same as that (FIG. 1) of the first embodiment, description thereof will be eliminated here.

Generally, for internal processing of an electronic camera, as shown in FIG. 9, in some cases, multiple times of saturation emphasis are performed on a picked-up image. Here, the multiple times of saturation emphasis are performed in the following order.

(1) First saturation emphasis by saturation emphasizing transformation matrix M1

(2) Tone conversion for each color component by gamma transformation G(x)

(3) Second saturation emphasis by saturation emphasizing transformation matrix M2

The inverse transforming section 13 reads tag information (such as EXIF information) from the inside of the file of an input image. Information on the above-mentioned image processing (M1, G(x), M2) are stored on the tag information.

The inverse transforming section 13 calculates inverse transformation for each of the information on image processing.

For example, for the saturation emphasizing transformation matrices M1 and M2, by performing well-known inverse-matrix operation, inverse transformation $M1^{-1}$ and $M2^{-1}$ are obtained.

Moreover, for example, for gamma transformation y=G (x), inverse function $x = G^{-1}(y)$ is obtained. The inverse function may be obtained by deriving a formula of the inverse function, by inversely referring to the data table of y=G(x) with y values, and by performing convergence operation for feed-backing [y−G(x)] as an error.

The saturation reducing section 14 performs inverse transformation in a reverse order to that of the image processing in the electronic camera on the input image. That is, the saturation reducing section 14 performs inverse transformation of the second saturation emphasis according to the following formula.

$$\begin{pmatrix} RDa \\ GDa \\ BDa \end{pmatrix} = M2^{-1} \begin{pmatrix} RU \\ GU \\ BU \end{pmatrix} \quad [5]$$

Next, the saturation reducing section 14 performs inverse transformation of gamma transformation according to the following formulas.

$$RDb = G^{-1}(RDa)$$

$$GDb = G^{-1}(GDa)$$

$$BDb = G^{-1}(BDa)$$

Subsequently, the saturation reducing section 14 performs inverse transformation of first saturation emphasis according to the following formula.

$$\begin{pmatrix} RDc \\ GDc \\ BDc \end{pmatrix} = M1^{-1} \begin{pmatrix} RDb \\ GDb \\ BDb \end{pmatrix} \quad [6]$$

By the above-mentioned processing, the color components (RDc, GDc, BDc) of the saturation reduction image are obtained. The color drift detecting section 15 and the color drift correcting section 16 perform color drift detection processing and color drift correction processing on the color components (RDc, GDc, BDc) of the saturation reduction image, respectively (refer to Steps S5 and S6 of the first embodiment). As a result, color components (RDc', GDc', BDc') after color drift correction are obtained.

The saturation emphasizing section 17 performs image processing in the same order as that of the image processing in the electronic camera on the color components (RDc', GDc', BDc') after the color drift correction.

That is, the saturation emphasizing section 17 performs first saturation emphasis according to the following formula.

$$\begin{pmatrix} RDd \\ GDd \\ BDd \end{pmatrix} = M1 \begin{pmatrix} RDc' \\ GDc' \\ BDc' \end{pmatrix} \quad [7]$$

Next, the saturation emphasizing section 17 performs gamma transformation according to the following formulas.

$$RDe = G(RDd)$$

$$GDe = G(GDd)$$

$$BDe = G(BDd)$$

Subsequently, the saturation emphasizing section 17 performs the second saturation emphasis according to the following formula.

$$\begin{pmatrix} RDf \\ GDf \\ BDf \end{pmatrix} = M2 \begin{pmatrix} RDe \\ GDe \\ BDe \end{pmatrix} \quad [28]$$

By the above-mentioned processing, the color components (RDf, GDf, BDf) of an output image are obtained.

Effect Etc. of the Second Embodiment

In the second embodiment, the same effects as that of the first embodiment can be acquired.

Further, in the second embodiment performs inverse transformation in a stepwise by tracing inversely on saturation emphasis performed multiple times. Therefore, it is possible to remove the false color structures derived from saturation emphasis, more correctly. As a result, it is possible to obtain a high-quality image with extremely less color drifts, false colors, and false color contours, and has fidelity to original color structures of an object.

Third Embodiment

Figure 10:
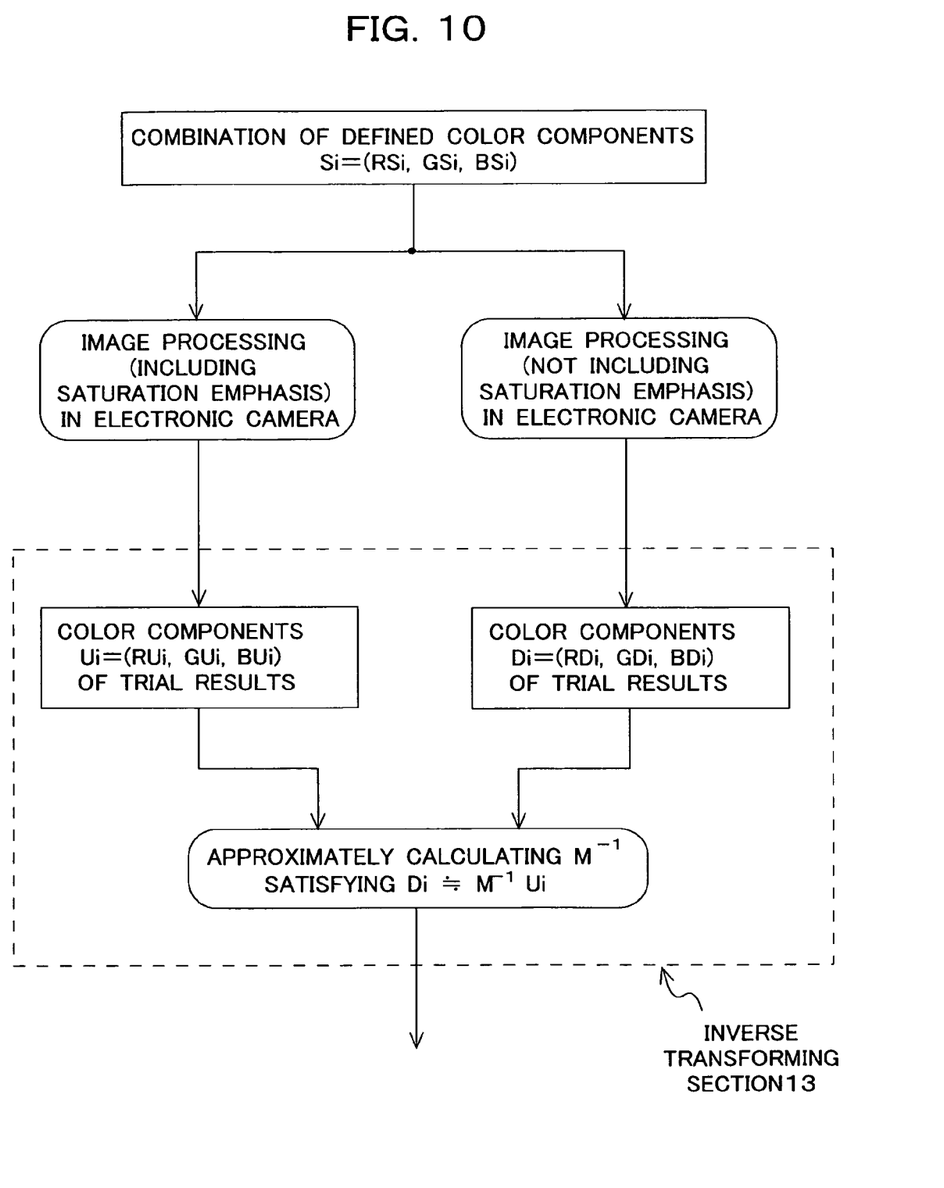
FIG. 10 is a flow chart showing operation of a third embodiment.

FIG. 10 is a flow chart showing operation of a third embodiment.

In the third embodiment, a case in which the inverse transformation of saturation emphasis is approximately calculated will be described. In addition, since the device configuration of the third embodiment is the same as that (FIG. 1) of the first embodiment, duplicated description thereof will be eliminated here.

First, a plurality of color components Si=(RSi, GSi, BSi) are defined in advance. For example, $8^3$=512 kinds of color components Si=(RSi, GSi, BSi) can be defined by the change of the color components RSi, GSi, and BSi into eight kinds, respectively. For example, when each color component is 12 bits tone, eight kinds of color components are set to be the values of [0, 512, 1024, 1536, 2048, 2560, 3072, 3584].

For these color components Si, the following two kinds of image processing are tried at the side in the electronic camera.

(1) Image processing (including saturation emphasis) performed inside the electronic camera (2) Image processing not including saturation emphasis (that is image processing (1) in which saturation emphasis is canceled)

By performing image processing (1) including saturation emphasis on a plurality of color components Si, for example, 512 kinds of color components Ui=(RUi, GUi, BUi) are obtained.

Moreover, by performing image processing (2) not including saturation emphasis on the defined color components Si, for example, 512 kinds of color components Di=(RDi, GDi, BDi) are obtained.

The inverse transforming section 13 acquires these trial results Ui and Di as saturation emphasis information on an input image U.

For example, these trial results Ui and Di are open to the public by manufacturers etc. as profile data of an electronic camera. In this case, the inverse transforming section 13 can acquire the profile data through communication media such as Internet or a recording medium.

Moreover, for example, the electronic camera may store the trial results Ui and Di on tag information in an image file. In this case, the inverse transforming section 13 can acquire the trial results Ui and Di from the tag information in the image file.

Moreover, for example, the image processing device 11 may have a function (camera control function) of controlling the electronic camera by a cable or radio waves. In this case, by using the camera control function, the electronic camera can generate the trial results Ui and Di. The inverse transforming section 13 may acquire the trial results Ui and Di from the electronic camera via a cable or radio waves.

The inverse transforming section 13, based on the trial results Ui and Di, obtains inverse-matrix $M^{-1}$ of saturation emphasis. To begin with, regarding the transformation matrix M of saturation emphasis and its inverse-matrix $M^{-1}$, in order to suppress image change other than saturation before and after transformation, the following constraint conditions are imposed.

$$g1(Q11,Q12,Q13)=Q11+Q12+Q13-1=0$$

$$g2(Q21,Q22,Q23)=Q21+Q22+Q23-1=0$$

$$g3(Q31,Q32,Q33)=Q31+Q32+Q33-1=0$$

In addition, Qmn in the above-mentioned formulas is an element of m-th row and n-th column of the inverse-matrix $M^{-1}$.

The inverse transforming section 13, under these constraint conditions, approximately calculates matrix $M^{-1}$ which minimizes the evaluation value E of the following formula (9) as an inverse transformation matrix of saturation emphasis.

$$E(M^{-1}) = \sum_i [Di - M^{-1}Ui]^2 \qquad [9]$$

$$M^{-1} = \begin{pmatrix} Q11 & Q12 & Q13 \\ Q21 & Q22 & Q23 \\ Q31 & Q32 & Q33 \end{pmatrix} \qquad [10]$$

For example, in such calculation, the inverse transforming section 13 performs the calculation of the formula (9) on a plurality of candidate matrices $M^{-1}$ satisfying the constraint conditions, and selects a matrix $M^{-1}$ in which the calculation value E becomes the minimum value.

Moreover, for example, by deriving Lagrange's undetermined multipliers $\lambda 1$, $\lambda 2$, and $\lambda 3$, the following formula defines.

$$E(Q11, \ldots, Q33, \lambda 1, \lambda 2, \lambda 3) = \qquad [11]$$
$$\sum_i [Di - M^{-1}Ui]^2 - \lambda 1 \times g1(Q11, Q12, Q13) -$$
$$\lambda 2 \times g2(Q21, Q22, Q23) - \lambda 3 \times g3(Q31, Q32, Q33)$$

The inverse transforming section 13, by the calculation of extremal values of E(Q11 to Q33, $\lambda 1$, $\lambda 2$, and $\lambda 3$) with numerical computing, can calculate $M^{-1}$ minimizing Formula (9) under constraint conditions. For example, the inverse transforming section 13 sets simultaneous equations causing all partial differential values of E(Q11 to Q33, $\lambda 1$, $\lambda 2$, and $\lambda 3$) to be zero, and can calculate $M^{-1}$ according to solution of the simultaneous equations.

The saturation reducing section 14 reduces the saturation of the input image U by using the matrix M−1 calculated as mentioned above and obtains a saturation reduction image.

The color drift detecting section 15 and the color drift correcting section 16 perform color drift detection processing and color drift correction processing on the saturation reduction image, respectively (refer to Steps S5 and S6 of the first embodiment). As a result, a color drift correction image is generated.

The saturation emphasizing section 17 obtains the inverse matrix of inverse transformation matrix $M^{-1}$, i.e., the transformation matrix M of saturation emphasis. The saturation emphasizing section 17 emphasizes the saturation of the color drift correction image by using the transformation matrix M and obtains an output image.

Effect Etc. of Third Embodiment

According to the third embodiment, the same effects as that of the first embodiment can be acquired.

Further, according to the third embodiment the inverse transformation of saturation emphasis is approximately calculated by using the trial data of saturation emphasis. In such processing, even for complicated saturation emphasis, it is possible to obtain the inverse transformation of the saturation emphasis by comparatively simple calculation.

As a result, it is possible to remove the false color structures derived from saturation emphasis from an input image, rapidly and suitably. As a result, it is possible to obtain a high-quality image with less color drifts, false colors, and false color contours, and has fidelity to original color structures of an object.

Supplementary Notes for Embodiment

In addition, according to the above-mentioned embodiments, saturation emphasis is performed again after color drift correction, but the present embodiment is not limited to this. For example, for an application such as image finishing application, in which material properties of an image are important, it is desirable to directly output color drift correction image from which both of color drift and saturation emphasis are removed.

Moreover, according to the above-mentioned embodiments acquires the information on the saturation emphasis performed on the input image, and obtains the inverse transformation of the saturation emphasis, but the present embodiment is not limited to this. For example, the saturation of an input image may be reduced by using a standard saturation reduction matrix (for example, Formula (2)). In this case, false color structures included in the input image cannot be removed completely. But, since the false color structures can be suppressed, the effect of color drift detection or color drift correction can be enhanced.

In addition, according to the above-mentioned embodiments, color drift detection is performed on the saturation reduction image, but is not limited to this. For example, by the acquirement of information on the magnification chromatic aberration of an optical system from the tag information of the input image, color drift may be obtained from the information on the magnification chromatic aberration. Even in such a case, by performing color drift correction on the saturation reduction image, the structures of color components coincide well with each other. Therefore, even for such processing, a good color drift correction effect can be acquired.

Moreover, according to the above-mentioned third embodiment, based on the trial results Ui and Di, the inverse-matrix $M^{-1}$ is obtained directly, but the present embodiment is not limited to this. For example, in the above-mentioned calculation procedure, by the replacement of the trial results Ui and Di each other, the transformation matrix M of saturation emphasis may be obtained first. In this case, by the calculation of the inverse matrix of the transformation matrix M, the inverse matrix $M^{-1}$ can be obtained.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to falling within the scope thereof.

The invention claimed is:

1. An image processing device including at least one processor detecting a color drift of an input image, comprising:
   a saturation reducing section reducing a saturation of the input image to suppress false color structures generated as a result of saturation emphasis in an electronic camera and generating via the at least one processor a saturation reduction image in which structural drifts of color components are removed by color drift correction; and
   a color position drift detecting section detecting a color position drift between color edges of the saturation reduction image.

2. The image processing device according to claim 1, further comprising
   an inverse transforming section acquiring information on a saturation emphasis performed on the input image and calculating an inverse transformation of the saturation emphasis, wherein
   the saturation reducing section performs the inverse transformation being calculated in the inverse transforming section on the input image and generates the saturation reduction image.

3. The image processing device according to claim 2, wherein
   the inverse transforming section calculates the inverse transformation of the saturation emphasis by approximation.

4. The image processing device according to claim 1, further comprising
   a color position drift correcting section performing a color position drift correction on the saturation reduction image generated by the saturation reducing section based on the color position drift between the color edges detected by the color position drift detecting section, and generating a color drift correction image.

5. The image processing device according to claim 4, further comprising
   a saturation emphasizing section emphasizing a saturation of the color drift correction image generated by the color position drift correcting section.

6. The image processing device according to claim 5, wherein
   the saturation emphasizing section performs an inverse transformation of the saturation reduction by the saturation reducing section on the color drift correction image.

7. An image processing device including at least one processor correcting a color drift of an input image, comprising:
   a saturation reducing section reducing a saturation of the input image to suppress false color structures generated as a result of saturation emphasis in an electronic camera and generating via the at least one processor a saturation reduction image in which structural drifts of color components are removed by color drift correction; and
   a color position drift correcting section performing a color position drift correction on the saturation reduction image and generating a color drift correction image.

8. A non-transitory computer readable storage medium storing a computer-executable program for an image processing device including at least one processor detecting a color drift of an input image, the program comprising:
   instructions for reducing a saturation of the input image to suppress false color structures generated as a result of saturation emphasis in an electronic camera and generating via the at least one processor a saturation reduction image in which structural drifts of color components are removed by color drift correction; and
   instructions for detecting a color position drift between color edges of the saturation reduction image.

\* \* \* \* \*